United States Patent
Goel

(10) Patent No.: US 8,831,190 B2
(45) Date of Patent: *Sep. 9, 2014

(54) TELEPHONE NUMBER-BASED ADVERTISING

(75) Inventor: Vinay Goel, Bangalore (IN)

(73) Assignee: Google Inc., Mountain View, CA (US)

( * ) Notice: Subject to any disclaimer, the term of this patent is extended or adjusted under 35 U.S.C. 154(b) by 140 days.

This patent is subject to a terminal disclaimer.

(21) Appl. No.: 13/539,746

(22) Filed: Jul. 2, 2012

(65) Prior Publication Data

US 2012/0269337 A1    Oct. 25, 2012

Related U.S. Application Data

(63) Continuation of application No. 11/948,171, filed on Nov. 30, 2007, now Pat. No. 8,218,741.

(60) Provisional application No. 60/990,256, filed on Nov. 26, 2007.

(51) Int. Cl.
| | |
|---|---|
| *H04M 3/42* | (2006.01) |
| *H04M 15/00* | (2006.01) |
| *H04L 12/66* | (2006.01) |
| *G06Q 30/00* | (2012.01) |
| *G06Q 30/02* | (2012.01) |
| *H04M 3/54* | (2006.01) |
| *H04M 17/00* | (2006.01) |
| *G06Q 30/06* | (2012.01) |
| *H04M 7/00* | (2006.01) |

(52) U.S. Cl.
CPC ........... *H04M 17/00* (2013.01); *G06Q 30/0264* (2013.01); *H04M 3/54* (2013.01); *G06Q 30/0255* (2013.01); *G06Q 30/0601* (2013.01); *H04M 7/003* (2013.01); *G06Q 30/0275* (2013.01); *G06Q 30/0242* (2013.01)
USPC ................. 379/114.13; 370/352; 379/102.06; 379/114.01; 379/201.01; 379/211.01; 455/410; 455/412.1; 705/14.1; 705/14.49; 705/14.69; 715/771; 725/62

(58) Field of Classification Search
CPC ........ H04M 3/54; H04M 7/003; H04M 17/00
USPC ........... 370/352; 379/102.06, 114.01, 114.13, 379/211.01, 201.01; 455/410, 412.1; 705/14.1, 14.49, 14.69; 715/771; 725/62

See application file for complete search history.

(56) References Cited

U.S. PATENT DOCUMENTS

| | | |
|---|---|---|
| 5,724,521 A | 3/1998 | Dedrick |
| 5,740,549 A | 4/1998 | Reilly et al. |

(Continued)

FOREIGN PATENT DOCUMENTS

| | | |
|---|---|---|
| JP | 2001312649 A | 11/2001 |
| JP | 2002374576 A | 12/2002 |

(Continued)

OTHER PUBLICATIONS

AdKnowledge Campaign Manager: Reviewer's Guide, AdKnowledge, Aug. 1998.

(Continued)

*Primary Examiner* — Gerald Gauthier

(74) *Attorney, Agent, or Firm* — Fish & Richardson P.C.

(57) ABSTRACT

Methods, systems, and apparatus, including computer program products, in which a first telephone number is associated with a second telephone number, and a web-based advertisement is served for an advertiser that includes the first telephone number. A call placed to the first telephone number is received, and the call is routed to the second telephone number based on the association of the second telephone number with the first telephone number. A determination as to whether a call-through event in response to receiving the call placed to the first telephone number has occurred, and an advertiser associated with the second telephone number is charged a cost-per-call amount if the call-through event is determined to have occurred.

22 Claims, 6 Drawing Sheets

(56) References Cited

U.S. PATENT DOCUMENTS

| | | | |
|---|---|---|---|
| 5,848,397 | A | 12/1998 | Marsh et al. |
| 5,948,061 | A | 9/1999 | Merriman et al. |
| 6,026,368 | A | 2/2000 | Brown et al. |
| 6,044,376 | A | 3/2000 | Kurtzman |
| 6,078,914 | A | 6/2000 | Redfern |
| 6,144,944 | A | 11/2000 | Kurtzman et al. |
| 6,167,382 | A | 12/2000 | Sparks et al. |
| 6,269,361 | B1 | 7/2001 | Davis et al. |
| 6,401,075 | B1 | 6/2002 | Mason et al. |
| 6,606,376 | B1 * | 8/2003 | Trell ................. 379/102.06 |
| 6,980,531 | B1 | 12/2005 | Rudrapatna |
| 6,985,882 | B1 | 1/2006 | Del |
| 7,039,599 | B2 | 5/2006 | Merriman et al. |
| 7,065,500 | B2 | 6/2006 | Singh et al. |
| 7,136,875 | B2 | 11/2006 | Anderson et al. |
| 7,272,217 | B1 | 9/2007 | Kocharlakota |
| 7,313,593 | B1 | 12/2007 | Pulito et al. |
| 7,366,683 | B2 | 4/2008 | Altberg et al. |
| 7,505,920 | B2 | 3/2009 | Agarwal et al. |
| 7,536,171 | B2 * | 5/2009 | Frank et al. ................. 455/410 |
| 7,995,723 | B2 | 8/2011 | Jacob et al. |
| 8,130,928 | B2 * | 3/2012 | Bookstaff ................. 379/201.01 |
| 8,131,594 | B1 | 3/2012 | Yehoshua et al. |
| 8,140,392 | B2 * | 3/2012 | Altberg et al. .............. 705/14.69 |
| 8,218,741 | B2 * | 7/2012 | Goel ................. 379/114.13 |
| 8,363,806 | B2 * | 1/2013 | Bookstaff ................. 379/201.01 |
| 8,478,240 | B2 * | 7/2013 | Aaltonen et al. ............ 455/412.1 |
| 8,601,386 | B2 * | 12/2013 | Altberg et al. ................. 715/771 |
| 2004/0039638 | A1 * | 2/2004 | Moriyama ................. 705/14 |
| 2005/0086104 | A1 * | 4/2005 | McFadden ................. 705/14 |
| 2005/0265322 | A1 * | 12/2005 | Hester ................. 370/352 |
| 2006/0271438 | A1 | 11/2006 | Shotland et al. |
| 2007/0038507 | A1 | 2/2007 | Kumar |
| 2007/0112656 | A1 | 5/2007 | Howe et al. |
| 2007/0136761 | A1 * | 6/2007 | Basmajian et al. ............. 725/62 |
| 2007/0143182 | A1 | 6/2007 | Faber et al. |
| 2008/0109845 | A1 | 5/2008 | Hengel et al. |
| 2008/0126209 | A1 | 5/2008 | Wong et al. |
| 2008/0162286 | A1 | 7/2008 | Lieberman et al. |
| 2008/0248815 | A1 | 10/2008 | Busch |
| 2008/0292071 | A1 | 11/2008 | Rand et al. |
| 2009/0003567 | A1 | 1/2009 | Trusler et al. |
| 2009/0070215 | A1 | 3/2009 | Strzeletz |
| 2009/0086958 | A1 | 4/2009 | Altberg et al. |
| 2009/0109978 | A1 | 4/2009 | Zhu et al. |
| 2009/0136011 | A1 * | 5/2009 | Goel ................. 379/114.01 |
| 2009/0313097 | A1 | 12/2009 | Chatterjee |
| 2010/0076837 | A1 | 3/2010 | Hayes et al. |
| 2012/0269337 | A1 * | 10/2012 | Goel ................. 379/211.01 |

FOREIGN PATENT DOCUMENTS

| | | |
|---|---|---|
| JP | 2004193757 A | 7/2004 |
| JP | 2005115945 A | 4/2005 |
| JP | 2008526111 A | 7/2008 |
| KR | 2006122559 A | 11/2006 |
| WO | WO9721183 A1 | 6/1997 |
| WO | WO2006069039 A2 | 6/2006 |
| WO | WO2007015531 A1 | 2/2007 |

OTHER PUBLICATIONS

AdKnowledge Market Match Planner: Reviewer's Guide, AdKnowledge, May 1998.

Ad-Star.com website archive from www. Archive.org, Apr. 12, 1997 and Feb 1, 1997.

Baseview Products, Inc., AdManagerPro Administration Manual v. 2.0, Dec. 1998.

Baseview Products, Inc., ClassManagerPro Administration Manual v. 1.0.5, Feb. 1, 1997.

Business Wire, "Global Network, Inc. Enters Into Agreement in Principle With Major Advertising Agency," Oct. 4, 1999.

Information Access Technologies, Inc., Aaddzz brochure, "The Best Way to Buy and Sell Web Advertising Space," © 1997.

Zeff, R. et al., Advertising on the Internet, 2nd Ed., John Wiley & Sons, 1999.

Dedrick, R., Interactive Electronic Advertising, IEEE, 1994.

Dedrick, R., A Consumption Model for Targeted Electronic Advertising, Intel Architecture Labs, IEEE, 1995.

Request for Reexamination of U.S. Patent No. 7,240,025 B2, Control No. 95/001,073, 2004.

Request for Reexamination of U.S. Patent No. 6,446,045 B1, Control No. 95/001,061, 2000.

Request for Reexamination of U.S. Patent No. 7,249,059 B2, Control No. 95/001,069, 2002.

Request for Reexamination of U.S. Patent No. 6,829,587 B2, Control No. 95/001,068, 2002.

AdForce, Inc., A Complete Guide to AdForce, Version 2.6, 1998.

AdForce, Inc., S-1/A SEC Filing, May 6, 1999.

Information Access Technologies, Inc., Aaddzz.com website archive from www. Archive.org, archived on Jan. 30, 1998.

Decision of Rejection for Japanese Application No. 2010-536082 dated Jul. 11, 2013, w/English translation, 5 pages.

Notice of Reasons for Rejection for Japanese Application No. 2010-536082 dated Mar. 18, 2013, w/English translation, 5 pages.

\* cited by examiner

TELEPHONE NUMBER-BASED ADVERTISING

CROSS-REFERENCE TO RELATED APPLICATIONS

This application is a continuation application of, and claims priority to, U.S. patent application Ser. No. 11/948,171, titled "TELEPHONE NUMBER-BASED ADVERTISING," which was filed on Nov. 30, 2007, which claims the benefit of U.S. Patent Application No. 60/990,256, titled "TELEPHONE NUMBER-BASED ADVERTISING," filed Nov. 26, 2007. The disclosure of each of the foregoing applications is incorporated herein by reference in their entirety.

BACKGROUND

This document relates to information management.

As the Internet has grown, online advertising has become a popular method by which advertisers can reach consumers. Online advertising provides opportunities for advertisers to target their advertisements to a receptive audience. Advertisements can be identified by one or more content servers in response to queries and listed on a content page provided by a publisher.

A publisher that lists the advertisement on the publisher's content page can charge the advertiser each time a user interacts with (e.g., clicks on) the advertisement on the content page (e.g., and is directed to a website associated with the advertiser). If, however, the user contacts the advertiser by calling a telephone number specific to the advertiser listed on the content page with the advertisement instead of clicking on the advertisement, the publisher may not have a readily verifiable way of charging the advertiser because the publisher may have no knowledge of the telephone call to the advertiser by the user.

Additionally, an advertiser may not have a website but nevertheless desires to advertise on the Internet. Such an advertiser can have advertisements that include the advertisers' telephone numbers served by a publisher. However, the publisher again may not be able to easily determine when a viewer calls the advertiser, and thus a less thousand impressions that is fixed regardless of the number of phone calls the advertiser actually receives in response to the advertisement.

SUMMARY

In general, one aspect of the subject matter described in this specification can be embodied in methods that include the actions of associating a first telephone number with a second telephone number; serving a web-based advertisement for an advertiser that includes the first telephone number; receiving a call placed to the first telephone number; routing the call to the second telephone number based on the association of the second telephone number with the first telephone number; determining whether a call-through event in response to receiving the call placed to the first telephone number has occurred; and charging an advertiser associated with the second telephone number a cost-per-call amount if the call-through event is determined to have occurred. Other embodiments of this aspect include corresponding systems, apparatus, and computer program products.

Another aspect of the subject matter described in this specification can be embodied in methods that include the actions of associating a first telephone number with a second telephone number; serving a web-based advertisement for an advertiser that includes the first telephone number; receiving a call placed to the first telephone number; identifying a calling number associated with an origination of the call; determining whether the calling number has originated calls to the first telephone number in excess of a threshold number of originations; and routing the call to the second telephone number if the calling number has not originated calls to the first telephone number in excess of the threshold number of originations. Other embodiments of this aspect include corresponding systems, apparatus, and computer program products.

Another aspect of the subject matter described in this specification can be embodied in methods that include the actions of associating a first telephone number with a second telephone number until an occurrence of an expiration event; determining whether the expiration event has occurred; disassociating the first telephone number from the second telephone number if the expiration event has occurred; and precluding association of the first telephone number with another second number for at least a minimum time period if the expiration event has occurred. Other embodiments of this aspect include corresponding systems, apparatus, and computer program products.

Optional advantages and features that can be realized by the subject matter described in this specification can include a more optimum billing for advertisements based on audience response to the advertisement. For example, advertisers with websites can be billed for advertisements that are either interacted with (e.g., clicked on) or for which a telephone call is placed to a number included in the advertisement. Likewise, and advertiser without a website can be billed for advertisements based on the number of telephone calls that are placed to a telephone number included in the advertisement. Additionally, usage information that includes a call-through rate can be provided to the advertiser, thus allowing the advertiser to evaluate the performance of the advertisement and facilitate advertising cost-benefit analyses.

These various optional advantages and features can be separately realized and need not be present in any particular embodiment. The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
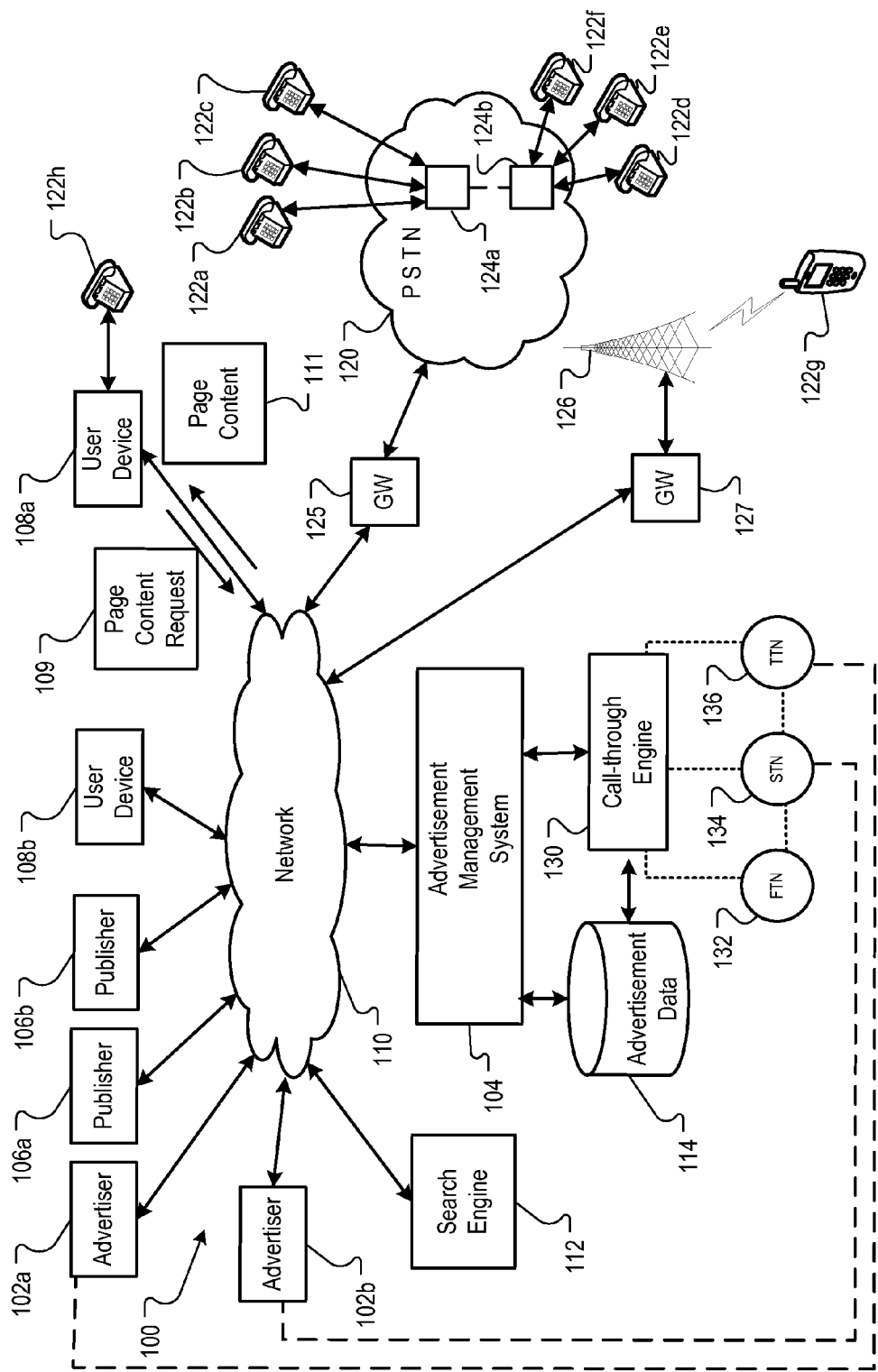
FIG. 1 is a block diagram of an example online environment.

FIG. 1 is a block diagram of an example online environment 100. The online environment 100 can facilitate the identification and serving of content items, e.g., web pages, advertisements, etc., to users. A computer network 110, such as a local area network (LAN), wide area network (WAN), the Internet, or a combination thereof, connects advertisers 102*a* and 102*b*, an advertisement management system 104, publishers 106*a* and 106*b*, user devices 108*a* and 108*b*, and a search engine 112. Although only two advertisers (102*a* and 102*b*), two publishers (106*a* and 106*b*) and two user devices (108*a* and 108*b*) are shown, the online environment 100 may include many (e.g., thousands) advertisers, publishers and user devices. The network 110 can communicate with other networks, both public and private, such as a public switched telephone network (PSTN) 120 and/or a cellular network 126. As will be described in detail below, the advertisement management system 104 can associate a first telephone number that is displayed on an web-based advertisement with a second telephone number of an advertiser. When the first telephone number is called by a user that viewed the advertisement, the call is routed the second telephone number that is associated with the advertiser. Accordingly, contacts that are made over a telephone network and that are attributed to the web-based advertisement can be accounted for. While reference is made to delivering advertisements, other forms of content including other forms of sponsored content can be delivered. Further, while reference is made to an example system that delivers content over the web, other media delivery systems including audio, video, broadcast, satellite, cable, print, etc., and other forms of media may be used.

In some implementations, one or more advertisers 102*a* and/or 102*b* can directly, or indirectly, enter, maintain, and track advertisement information in the advertising management system 104. The advertisements can be in the form of graphical advertisements, such as banner advertisements, text only advertisements, image advertisements, audio advertisements, video advertisements, advertisements combining one of more of any of such components, etc., or any other type of electronic advertisement document 120. The advertisements may also include embedded information, such as a links, meta-information, and/or machine executable instructions, such as HTML or JavaScript™.

A user device, such as user device 108*a*, can submit a page content request 109 to a publisher or the search engine 112. In some implementations, the page content 111 can be provided to the user device 108*a* in response to the page content request 109. The page content can include advertisements provided by the advertisement management system 104, or can include executable instructions, e.g., JavaScript™ instructions, that can be executed at the user device 108*a* to request advertisements from the advertisement management system 104. Example user devices 108 include personal computers, mobile communication devices, television set-top boxes, etc.

Advertisements can also be provided from the publishers 106. For example, one or more publishers 106*a* and/or 106*b* can submit advertisement requests for one or more advertisements to the system 104. The system 104 responds by sending the advertisements to the requesting publisher 106*a* or 106*b* for placement on one or more of the publisher's web properties (e.g., websites and other network-distributed content). The advertisements can include embedded links to landing pages, e.g., pages on the advertisers' 102 websites that a user is directed to when the user clicks an ad presented on a publisher website. The advertisement requests can also include content request information. This information can include the content itself (e.g., page or other content document), a category corresponding to the content or the content request (e.g., arts, business, computers, arts-movies, arts-music, etc.), part or all of the content request, content age, content type (e.g., text, graphics, video, audio, mixed media, etc.), geo-location information, etc.

In some implementations, a publisher 106 can combine the requested content with one or more of the advertisements provided by the system 104. This combined page content 111 and advertisements can be sent to the user device 108 that requested the content (e.g., user device 108*a*) as page content 111 for presentation in a viewer (e.g., a web browser or other content display system). The publisher 106 can transmit information about the advertisements back to the advertisement management system 104, including information describing how, when, and/or where the advertisements are to be rendered (e.g., in HTML or JavaScript™).

Publishers 106*a* and 106*b* can include general content servers that receive requests for content (e.g., articles, discussion threads, music, video, graphics, search results, web page listings, information feeds, etc.), and retrieve the requested content in response to the request. For example, content servers related to news content providers, retailers, independent blogs, social network sites, or any other entity that provides content over the network 110 can be a publisher.

Advertisements can also be provided through the use of the search engine 112. The search engine 112 can receive queries for search results. In response, the search engine 112 can retrieve relevant search results from an index of documents (e.g., from an index of web pages). An exemplary search engine 112 is described in S. Brin and L. Page, "The Anatomy of a Large-Scale Hypertextual Search Engine," Seventh International World Wide Web Conference, Brisbane, Australia (1998) and in U.S. Pat. No. 6,285,999. Search results can include, for example, lists of web page titles, snippets of text extracted from those web pages, and hypertext links to those web pages, and may be grouped into a predetermined number of (e.g., ten) search results.

The search engine 112 can also submit a request for advertisements to the system 104. The request may include a number of advertisements desired. This number may depend on the search results, the amount of screen or page space occupied by the search results, the size and shape of the advertisements, etc. The request for advertisements may also include the query (as entered, parsed, or expanded), information based on the query (such as geo-location information, whether the query came from an affiliate and an identifier of such an affiliate), and/or information associated with, or based on, the search results. Such information may include, for example, identifiers related to the search results (e.g., document identifiers), scores related to the search results (e.g., information retrieval ("IR") scores), snippets of text extracted from identified documents (e.g., web pages), full text of identified documents, feature vectors of identified documents, etc. In some implementations, IR scores can be computed from, for example, dot products of feature vectors corresponding to a query and a document, page rank scores, and/or combinations of IR scores and page rank scores, etc.

The search engine 112 can combine the search results with one or more of the advertisements provided by the system 104. This combined information can then be forwarded to the user device 108 that requested the content as the page content 111. The search results can be maintained as distinct from the advertisements, so as not to confuse the user between paid advertisements and search results.

The advertisers 102, user devices 108, and/or the search engine 112 can also provide usage information to the advertisement management system 104. This usage information can include measured or observed user behavior related to advertisements that have been served, such as, for example, whether or not a conversion or a selection related to an advertisement has occurred. The system 104 performs financial transactions, such as crediting the publishers 106 and charging the advertisers 102 based on the usage information. Such usage information can also be processed to measure performance metrics, such as a click-through rate ("CTR"), conversion rate, call-through rate ("KTR") etc.

A click-through can occur, for example, when a user of a user device, selects or "clicks" on a link to a content item returned by the publisher or the advertising management system. The CTR is a performance metric that is obtained by dividing the number of users that clicked on the content item, e.g., a link to a landing page, an advertisement, or a search result, by the number of times the content item was delivered. For example, if a link to a content item is delivered 100 times, and three persons click on the content item, then the CTR for that content item is 3%. Other usage information and/or performance metrics can also be used.

A "conversion" occurs, for example, when a user consummates a transaction related to a previously served advertisement. What constitutes a conversion may vary from case to case and can be determined in a variety of ways. For example, a conversion may occur when a user clicks on an advertisement, is referred to the advertiser's web page, and consummates a purchase there before leaving that web page. A conversion can also be defined by an advertiser to be any measurable/observable user action such as, for example, downloading a white paper, navigating to at least a given depth of a Website, viewing at least a certain number of Web pages, spending at least a predetermined amount of time on a Website or Web page, registering on a Website, etc. Other actions that constitute a conversion can also be used.

A call-through can occur, for example, when a user calls a telephone number associated with an advertisement returned by the publisher or the advertising management system.

In addition to the advertisements being selected based on content such as a search query or web page content of a publisher, the advertisements can also be selected from an auction. In some implementations, the advertisement management system 104 includes an auction process. Advertisers 102 may be permitted to select, or bid, an amount the advertisers are willing to pay for each telephone call to the advertisers as a result of a user viewing the advertisement and calling the telephone number associated with the advertiser listed in the advertisement. For example, advertisers A, B, and C all select, or bid, a cost-per-call of $0.05, $0.07, and $–0.10, respectively. The amount advertiser A will pay for a call placed to the advertiser A is $0.05, the amount advertiser B will pay is $0.10, and the amount advertiser C will pay is $0.07. The advertisements, associated usage data, and bidding parameters described above can be stored as advertisement data in an advertisement data store 114.

As can be appreciated from the foregoing, the advertising management system 104 permits the serving of advertisements targeted to documents served by the publishers 106 and the search engine 112. Additionally, the usage information described above can be used by the advertisement management system 104 to serve higher performing advertisements that are more likely to elicit a response from users of the user devices 108*a* and 108*b*.

In some implementations, the serving of the advertisements, such as the advertisement 120, can be further optimized by tracking whether the advertisers associated with the advertisements are contacted by users calling the advertiser.

The environment 100 can include a public switched telephone network (PSTN) 120 coupled to the network 110 by a gateway 125. Telephone devices 122*a-f* can communicate over the PSTN 120. The PSTN 120 includes switching elements 124*a-b* for identifying information from calls received from telephone devices 122*a-f* and directing these calls to the called party. The PSTN 120 can be circuit-switched telephone network, which may be used for analog and/or digital communication links, e.g., time-division multiplexed (TDM) signaling, Integrated Services Digital Network (ISDN) signaling, internet access, dial-up modems to the Internet, etc.

Telephone devices 122*a-f* comprise any telecommunication device operable to electronically receive and transmit audio, including voice and dual-tone multi-frequency (DTMF) data. Generally, a telephone device operates through transmission of electric signals over the PSTN 120 to allow users to communicate. The environment 100 may include other communication devices such as cellular phones, IP phones, soft phones, and/or others communication devices that may communicate over the network 110 either alone or in conjunction with the PSTN 120 and/or other networks. In some implementation, telephone numbers provided by Internet advertisements direct call initiation requests from the telephone device 122 to the switching element 124 and from the switching element to the calling party.

The switching element 124 comprises any hardware, software, and/or firmware operable to route calls between devices in the PSTN 120 and the entity associated with the telephone number dialed. For example, the switching element 124 may receive a request to initiate a call from the telephone device 122 and based, at least in part, on the request, route the call to another element in communication with the PSTN 120, such as the advertisement management system 104.

In addition to the PSTN network 120, other telephone networks and/or protocols can also be used. For example, a cellular telephone 122*g* can communicate with the network 110 over a cellular network 126 and a gateway 127. Likewise, a voice over Internet Protocol (VoIP) telephone 122*h* can communicate over the network 110.

In some implementations, the advertisement management system 104 can associate a first telephone number that is displayed on an web-based advertisement with a second telephone number associated with an advertiser. The advertisement management system 104 can include a call-through engine 130 that may include instructions, algorithms, or other directives for mapping a telephone number displayed in an Internet advertisement to an associated advertiser 102. For example, a user of the user device 108*a* may call the first number displayed on an Internet advertisement by using the telephone 122*a*. The switching element 124 may receive a request to initiate a call that identifies a telephone number presented in an Internet advertisement, where the identified telephone number is associated with the advertisement management system 104 and, in response to the request, forward the call to the advertisement management system 104. The call-through engine 130 can map the dialed number to the second number associated with an advertiser 102. In connection with identifying the advertiser 102, the call-through engine 130 may route, switch or otherwise transmit the call in response to the request to the advertiser 102. Usage and billing data for the telephone call can also be collected and updated by the advertisement management system 104 in response to the telephone call. A similar call placement and routing process can also be used if the user of the user device 108 placed the call using the cellular telephone 122*g* or the VoIP phone 122*h*.

In some implementations, the advertisement management system 104 can purchase the use of many unique first telephone numbers 132. The advertisement management system 104 can uniquely associate these first telephone numbers with the second telephone numbers 134 of the advertisers 102 and display these first telephone numbers in web-based advertisements for the advertisers 102. Accordingly, when the first telephone numbers 132 are called, the calls are routed to the advertisement management system 104 and then routed to the advertiser's actual telephone numbers (second telephone numbers 134).

In some implementations, a first telephone number 132 can include a common telephone number with many extensions. Therefore, more than one advertiser 102 or other entity can be associated with the same common telephone number. However, each extension is only assigned to one entity. Therefore, a first telephone number 132 that is a common telephone number with an extension is unique to the advertiser 102 associated with that telephone number and extension. For example, the telephone number "888-888-8888" can be associated with more than one advertiser 102; but the telephone number "888-888-8888, ext. 123" is only associated with one advertiser 102. In some implementations, the first telephone number 132 can be used to track whether a user contacts the advertiser 102 as a result of viewing the advertisement provided by the call-through engine 130. If, for example, a user contacts the advertiser 102 by dialing the first telephone number, the call-through engine 130 can determine that the user viewed the first telephone number 132 on the web-based advertisement. If, however, a user contacts the advertiser by dialing the second telephone number 134, it may be concluded that the user most likely did not see the web-based advertisement that displayed the first telephone number 132, since the second telephone number is not listed in the advertisement.

For example, suppose an advertiser A has an associated telephone number (i.e., the second telephone number) "222-222-2222." The call-through engine 130 can associate a first telephone number "111-111-1111" with the advertiser A. No other entity will be associated with the first telephone number "111-111-1111." The first telephone number "111-111-1111" can be listed in the advertisement associated with advertiser A. When a user calls the advertiser A using the first telephone number "111-111-1111," the call can be routed to the advertisement management system 104. The call-through engine 130 can determine the advertiser associated with the first telephone number, e.g., advertiser A. The call-through engine 130 can determine the second telephone number associated with the advertiser, e.g., "222-222-2222," and can route the call to the second telephone number "222-222-2222" associated with the advertiser of the advertisement.

In some implementations, the route-engine 130 can determine whether a call-through event occurred in response to when the call placed to the first telephone number 132 was received. The call-through event can be, for example, an event that is based on a calling number placing a call to the first number 132 more than a predetermined number of times. The call-through engine 130 can, for example, determine if the call-through event occurred by first identifying a calling number associated with the origination of the call. If the calling number has originated calls to the first telephone 132 in excess of a predetermined threshold number of originations, the call-through engine 130 can preclude the identification of the occurrence of a call-through event for the second telephone number 134. If the calling number has not originated calls to the first telephone 132 in excess of the predetermined threshold number of originations, the call-through engine 130 can identify the occurrence of a call-through event for the second telephone number 134.

For example, suppose also that in the example above, the call-through engine 130 has determined the threshold number of originations is five. Therefore, a calling number can originate a call to the first telephone number "111-111-1111" five or less times in order to identify each call as a call-through event for the second telephone number "222-222-2222." If, for example, the calling number "888-888-8888" has originated calls to the first telephone number "111-111-1111" more than five times, then the call-through engine 130 can preclude the identification of the occurrence of a call-through event for the second telephone number "222-222-2222" after the fifth call. In some implementations, if the call-through event does not occur, then the call is not routed to the second telephone number 134.

The threshold limitation can be used to preclude unwarranted charges to the advertiser 102. Typically the advertiser 102 will provide the advertiser's actual number to the caller for future calls. However, not all callers may call the actual number of the advertiser, e.g., a caller may have printed the advertisement displayed on the computer. Accordingly, the advertisement management system 104 can utilize the threshold determination to avoid unwarranted charges to the advertiser 102.

In some implementations, the call is routed to the second telephone number 134 if the threshold number of originations has not yet been met. For example, a threshold number of originations can be set to ten. Therefore, a calling number can originate a call to a first telephone number 132 ten times, and the call-through engine 130 can route the call to the second telephone number 134 ten times. On the eleventh call, the call-through engine 130 does not route the call to the second telephone number 134 because the number of originations, e.g., ten, has been exceeded. In variations of these implementations, the call-through engine 130 can announce the actual number 134 of the advertiser 102 to the caller for calls in excess of the threshold number of originations. For example, suppose the calling number "888-888-8888" has originated calls to the first telephone number "111-111-1111" five times and the maximum number of originations is five. On the sixth call, instead of routing the call to the second telephone number "222-222-2222," the call-through engine 130 can provide the second telephone number to the calling party by announcing the second telephone number "222-222-2222" during the call. The call is therefore never routed to the second telephone number 134.

In some implementations, if the call is routed to the second telephone number 134 and a busy signal is reached, an origination does not result, and thus a call-through is not attributed to the attempted telephone call. In this implementation, the calling party has to answer, either by a person or by an answering machine or service, in order for the call to count as an origination.

In some implementations, if the first telephone number 132 has not originated calls to the second telephone number 132 in excess of the threshold number of originations, the call-through engine 130 can route the call to the second telephone number 134. Each time the call is routed from the first telephone number 132 to the second telephone number 134, the number of originations can increase by one origination. In some implementations, even if a busy signal is reached, an origination can result because the call was routed to the second telephone number 134.

In some implementations, the call-through engine 130 can associate the first telephone number 132 and second telephone number 134 for only a predetermined period of time. For example, an advertiser's actual telephone number can be associated with a unique telephone number for a week or a month. After the predetermined period of time ends, the call-through engine 130 can disassociate the first telephone number 132 with the second telephone 134. Therefore, a user cannot call the first telephone number to reach the advertiser. The first telephone number can then be associated with a third telephone 136 number after the predetermined period of time ends. The third telephone number 136 can, for example, be associated with a different advertiser 102 after a "hibernation period," e.g., two months after being disassociated with a first telephone number 132 of a previous advertiser 102. Hibernating a telephone number includes precluding association of the telephone number with another second telephone number 134 for a predetermined period of time. For example, once a first telephone number 132 has been disassociated from a second telephone number 134, the first telephone number 132 can be hibernated, and not used for a period of time. Therefore, the first telephone number 132 will not be associated with any advertisers 102 during this time.

For example, suppose the first telephone number 132 is associated with the second telephone number 134 of advertiser B, and the association is only for a month. After the month ends, the first and second telephone numbers are disassociated from each other. Therefore, the first telephone number 132 is no longer associated with advertiser B. At this point, the first telephone number 132 is free to be associated with a different advertiser 102, or, alternatively, may be placed in hibernation for a time period of several months. The first telephone number can immediately, or after the hibernation period, be associated with a third telephone number 136 that, for example, belongs to advertiser C.

In some implementations, an advertiser 102 associated with the second telephone number 134 can be charged a cost-per-call amount in response to routing the call to the second telephone number 134. For example, each time the call is routed to the second telephone number 134, the advertiser can be charged the cost-per-call amount. The cost-per-call amount can, for example, include the amount an advertiser 102 pays when a call is routed to the advertiser's associated, or actual, telephone number, or second telephone number 132, as a result of a user calling the first telephone number 132 and having the call routed to the second telephone number 134. In some implementations, the advertiser 102 can be charged the cost-per-call amount even if the call is routed to the second telephone number 134 and a busy signal is reached.

In some implementations, if a busy signal is reached even though the call is routed, the advertiser 102 associated with the second telephone number 134 is not charged the cost-per-call amount. In some implementations, if an answering service or machine picks up the call, the advertiser is charged a reduced portion of the cost-per-call amount.

In another implementation, the advertiser 102 can also be charged the cost-per-call amount when a call event is identified by the call-through engine 130. For example, as long as a predetermined threshold of originations has not been met, each time a calling number calls a first telephone number 132 and the call is routed to the second telephone number 134, the advertiser associated with the second telephone number 134 is charged the cost-per-call amount.

In some implementations, the advertiser 102 associated with the second telephone number 134 can be associated with an account balance. Therefore, each time the advertiser 102 is charged a cost-per-call amount, the cost-per-call amount is deducted from the account balance. In some implementations, the account balance can be checked to make sure appropriate funds exist in the account before the call is routed to the second telephone number. If the account balance is lower than the cost-per-call amount associated with the advertiser 102, the call-through engine 130 can preclude routing the call from the first telephone number 132 to the second telephone number 134.

In some implementations, if the call is routed to the second telephone number 134 and a busy signal is reached, the advertiser 102 associated with the second telephone number is not charged the cost-per-call amount. In another implementation, if an answering machine or service answers the call that is routed to the second telephone number 134, the advertiser 102 is charged the cost-per-call amount.

Figure 2:
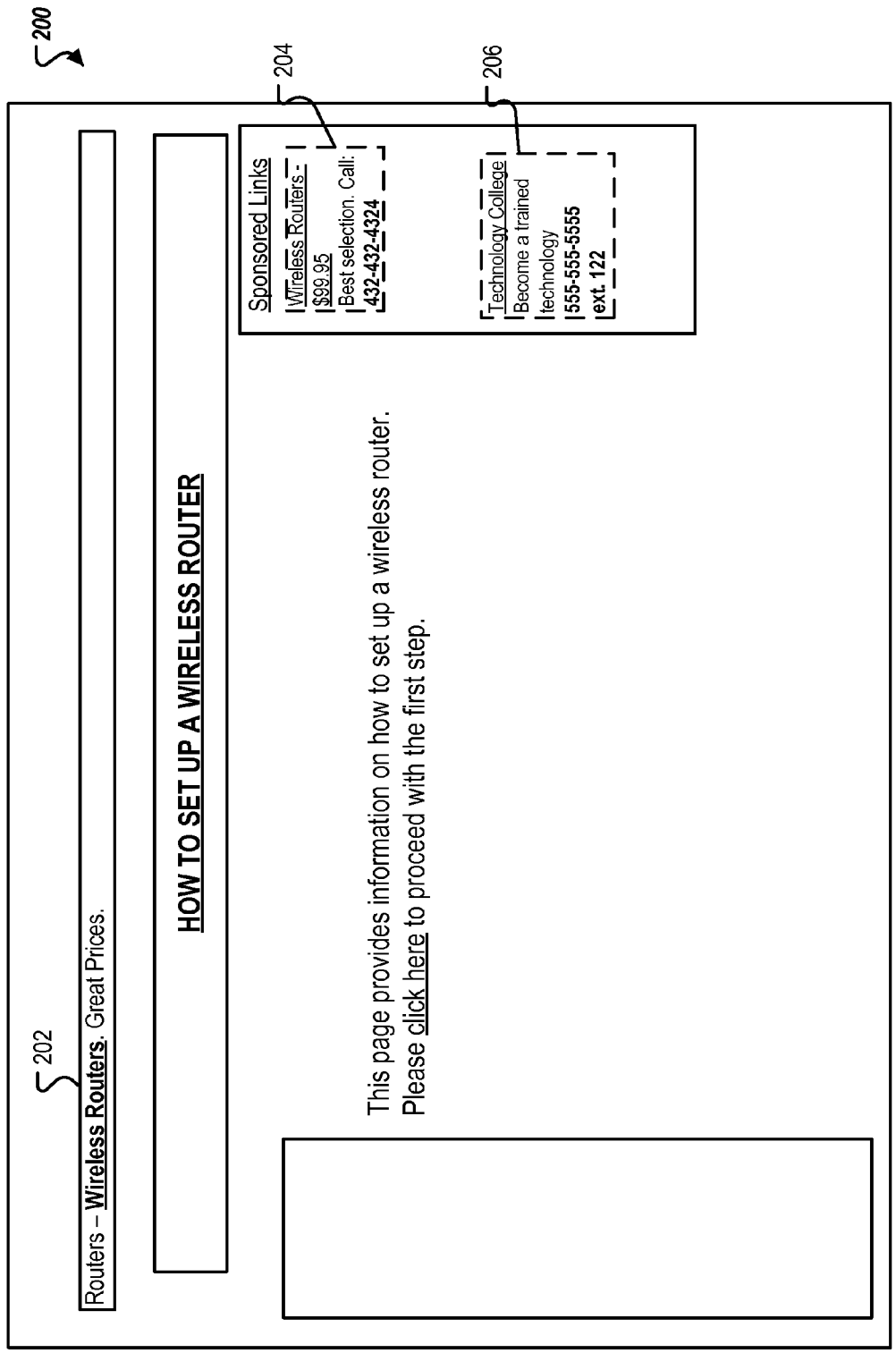
FIG. 2 is a screen shot of an example content page and advertisements associated with telephone numbers.

FIG. 2 is a screen shot depicting a content page 200 containing one or more advertisements 202, 204, 206. While some of the advertisements, e.g., 202, are not associated with a first telephone number, other advertisements 204, 206 can be associated with a first telephone number. For example, advertisement 204 is associated with a first telephone number "432-432-4324" which is a unique telephone number. Therefore, only the advertiser associated with the advertisement 204 is associated with the telephone number "432-432-4324." Advertisement 206 is associated with the first telephone number "555-555-5555 ext. 122" which is a common telephone number with an extension.

The advertisers 102 associated with advertisement 204 and 206 are each associated with a second telephone number, or the advertiser's actual telephone number. The actual telephone number is not listed in the advertisements 204 and 206. Therefore, anyone that wishes to contact the advertiser for advertiser 204 can dial the unique telephone number "432-432-4324" and the call is then routed to the advertisement management system 104. Depending on a variety of factors, such as for example, whether the calling party has originated calls to the telephone number "432-432-4324" more than a predetermined number of times, the call can be routed to the actual telephone number, or second telephone number, associated with the advertiser of advertisement 204. When the call is routed, the advertiser can be charged a cost-per-call amount. A similar call process can be used for calls placed to the telephone number "555-555-5555 ext. 122" for the advertiser associated with the advertisement 206.

Although only three advertisements, 202, 204, 206 are shown in FIG. 2, additional advertisements could also be presented on the content page. Additionally, while the advertisements shown in FIG. 2 are in text advertisements, other advertisement types could also be used, e.g., an advertisement with graphics.

Figure 3:
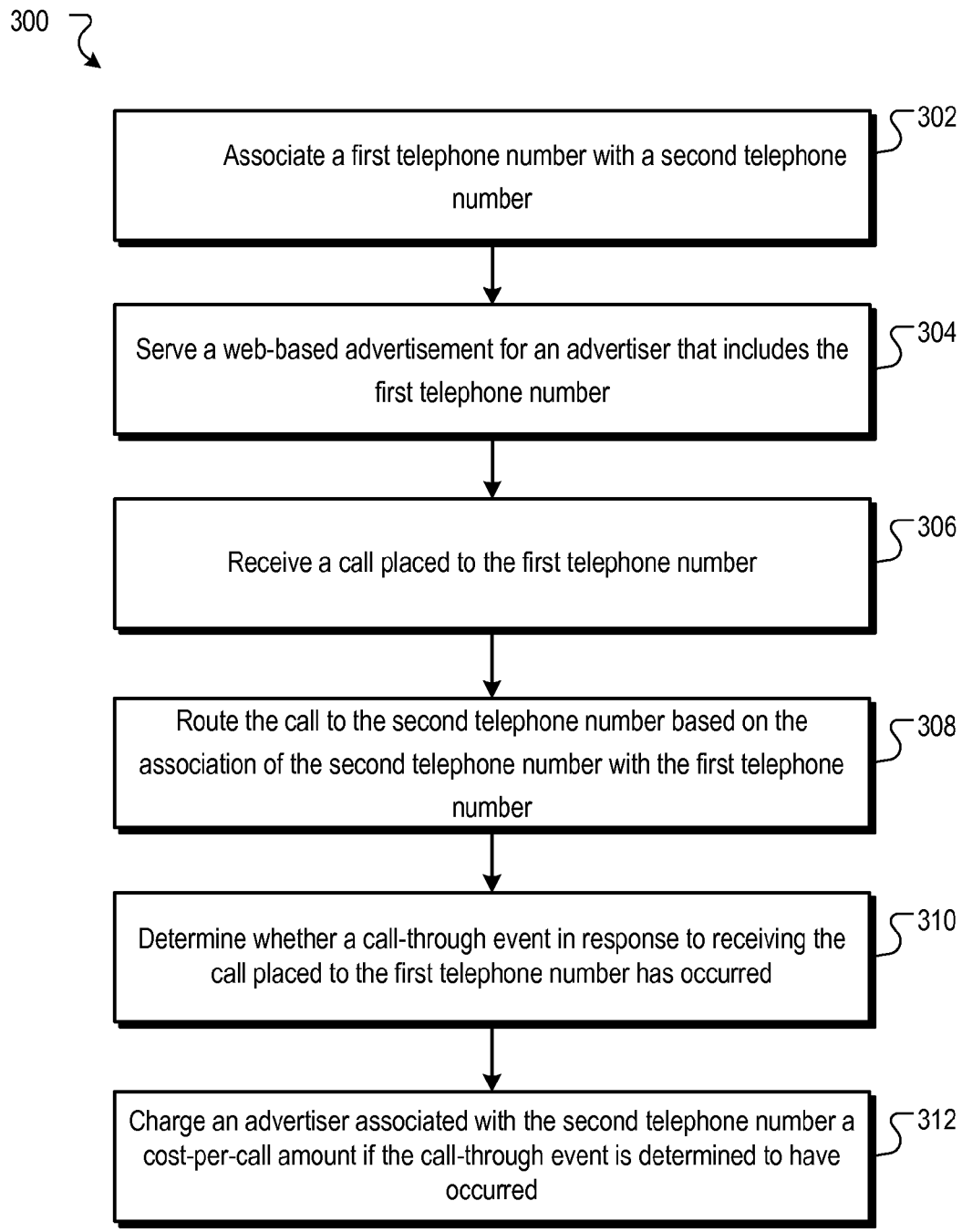
FIG. 3 is a flow diagram of an example process for tracking advertisements using telephone numbers.

FIG. 3 is a flow diagram of an example process 300 for routing calls. The process 300 can, for example, be implemented in the advertisement management system 104 of FIG. 1, or in some other hardware and software computing device.

Stage 302 associates a first telephone number with a second telephone number. For example, the call-through engine 130 can associate a first telephone number with a second telephone number.

Stage 304 serves a web-based advertisement for an advertiser that includes the first telephone number. For example, the call-through engine 130 can serve a web-based advertisement for an advertiser that includes the first telephone number.

Stage 306 receives a call placed to the first telephone number. For example, the call-through engine 130 can receive a call placed to the first telephone number.

Stage 308 routes the call to the second telephone number based on the association of the second telephone number with the first telephone number. For example, the call-through engine 130 can route the call to the second telephone number based on the association of the second telephone number with the first telephone number.

Stage 310 determines whether a call-through event in response to receiving the call placed to the first telephone number has occurred. For example, the call-through engine 130 can determine whether a call-through event in response to receiving the call placed to the first telephone number has occurred.

Stage 312 charges an advertiser associated with the second telephone number a cost-per-call amount if the call-through event is determined to have occurred. For example, the call-through engine 130 can charge an advertiser associated with the second telephone number a cost-per-call amount if the call-through event is determined to have occurred.

Figure 4:
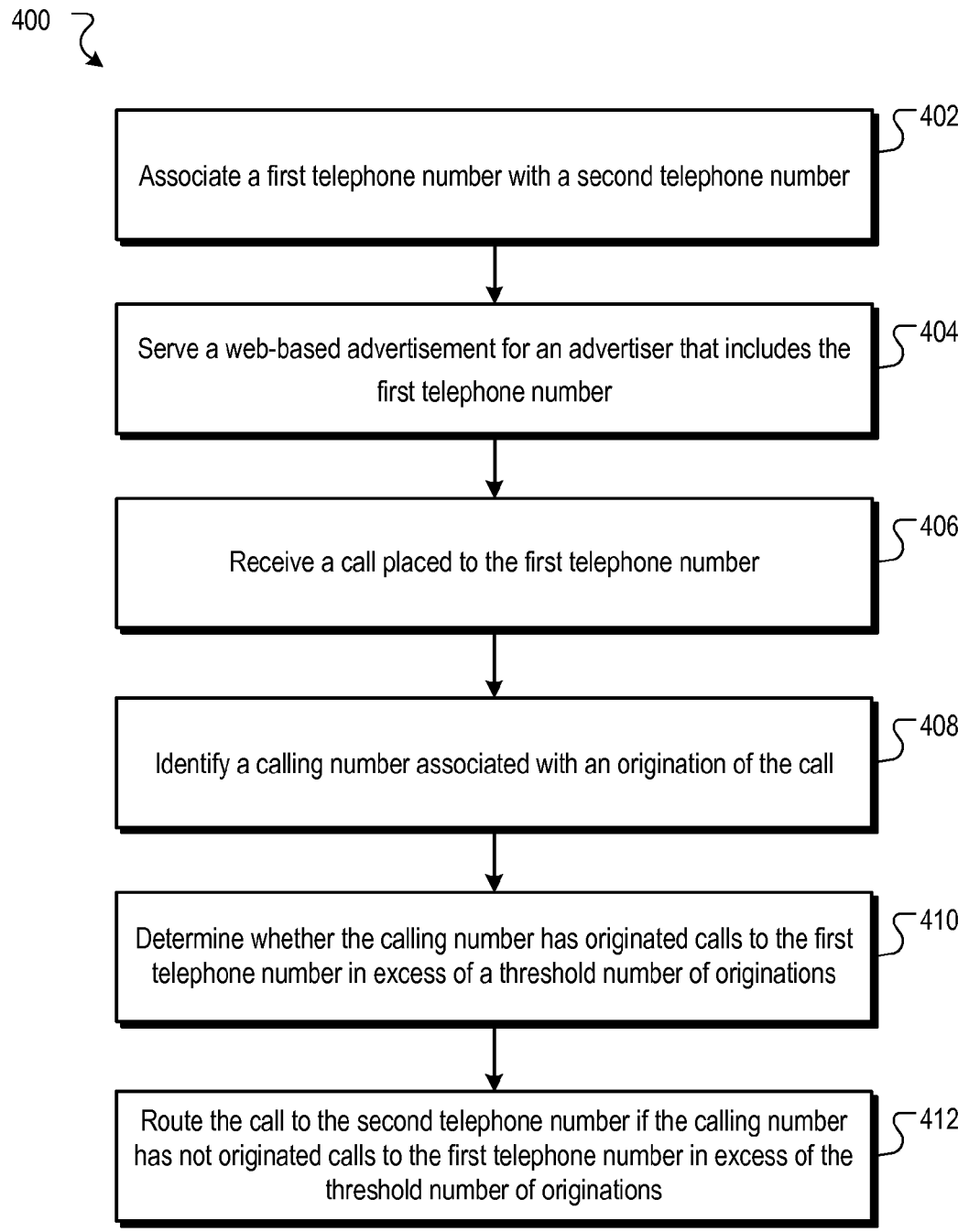
FIG. 4 is another flow diagram of an example process for tracking advertisements using telephone numbers.

FIG. 4 is another flow diagram of an example process 400 for routing calls. The process 400 can, for example, be implemented in the advertisement management system 104 of FIG. 1, or in some other hardware and software computing device.

Stage 402 associates a first telephone number with a second telephone number. For example, the call-through engine 130 can associate a first telephone number with a second telephone number.

Stage 404 serves a web-based advertisement for an advertiser that includes the first telephone number. For example, the call-through engine 130 can serve a web-based advertisement for an advertiser that includes the first telephone number.

Stage 406 receives a call placed to the first telephone number. For example, the call-through engine 130 can receive a call placed to the first telephone number.

Stage 408 identifies a calling number associated with an origination of the call. For example, the call-through engine 130 can identify a calling number associated with an origination of the call.

Stage 410 determines whether the calling number has originated calls to the first telephone number in excess of a threshold number of originations. For example, the call-through engine 130 can determine whether the calling number has originated calls to the first telephone number in excess of a threshold number of originations.

Stage 412 routes the call to the second telephone number if the calling number has not originated calls to the first telephone number in excess of the threshold number of originations. For example, the call-through engine 130 can route the call to the second telephone number if the calling number has not originated calls to the first telephone number in excess of the threshold number of originations.

Figure 5:
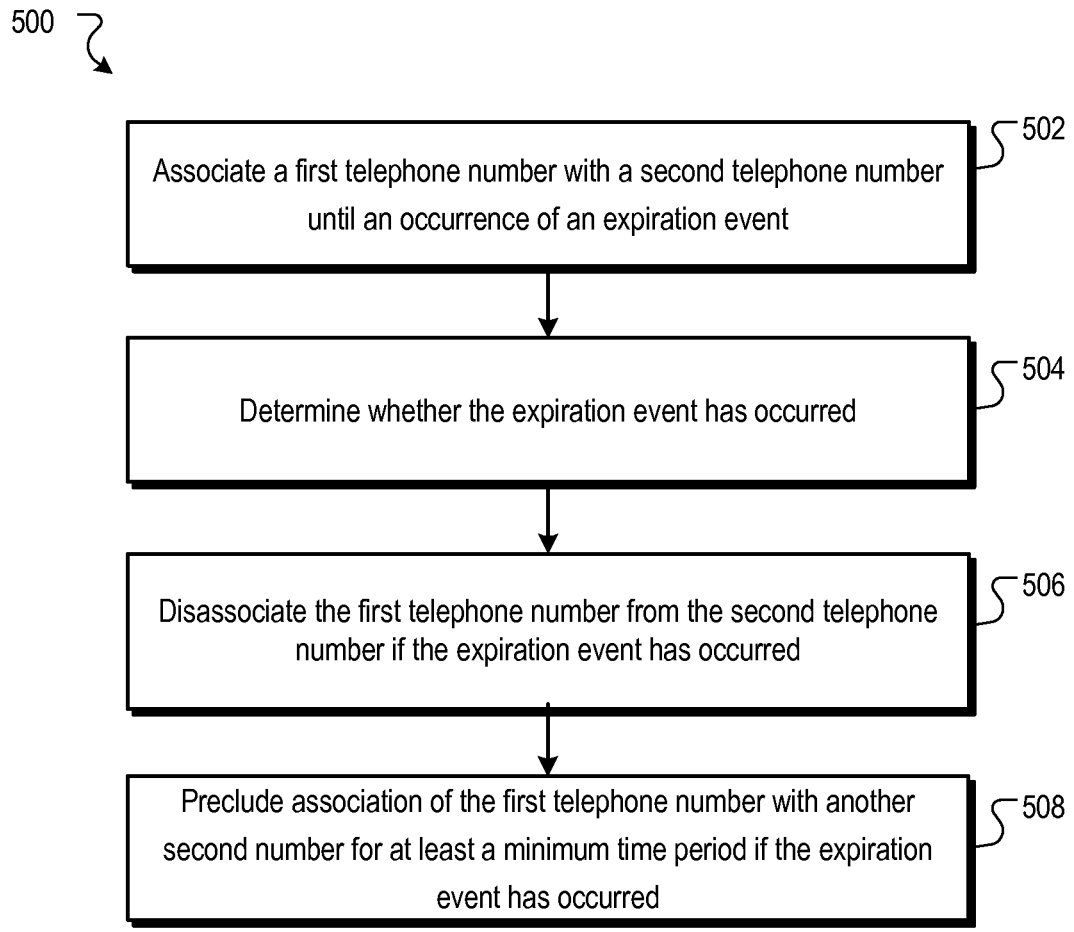
FIG. 5 is another flow diagram of an example process for tracking advertisements using telephone numbers.

FIG. 5 is another flow diagram of another example process 500 for routing calls. The process 500 can, for example, be implemented in the advertisement management system 104 of FIG. 1, or in some other hardware and software computing device.

Stage 502 associates a first telephone number with a second telephone number until an occurrence of an expiration event. For example, the call-through engine 130 can associate a first telephone number with a second telephone number until an occurrence of an expiration event.

Stage 504 determines whether the expiration event has occurred. For example, the call-through engine can determine whether the expiration event has occurred.

Stage 506 disassociates the first telephone number from the second telephone number if the expiration event has occurred. For example, the call-through engine 130 can disassociate the first telephone number from the second telephone number if the expiration event has occurred.

Stage 508 precludes association of the first telephone number with another second number for at least a minimum time period if the expiration event has occurred. For example, the call-through engine 130 can preclude association of the first telephone number with another second number for at least a minimum time period the second telephone number if the expiration event has occurred.

Figure 6:
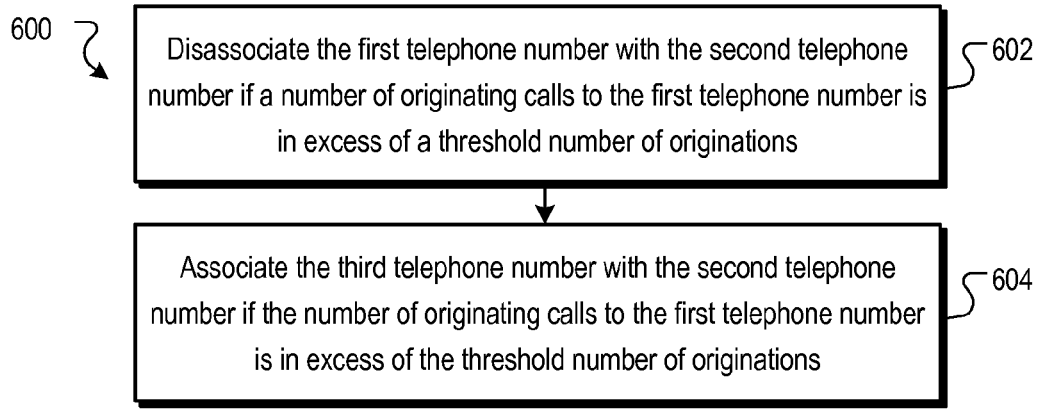
FIG. 6 is a flow diagram of an example process for processing an expiration event based on originations.

FIG. 6 is a flow diagram of an example process 600 for processing an expiration event based on originations. The process 600 can, for example, be implemented in the advertisement management system 104 of FIG. 1, or in some other hardware and software computing device Stage 602 disassociates the first telephone number with the second telephone number if a number of originating calls to the first telephone number is in excess of a threshold number of originations. For example, the call-through engine 130 can disassociate the first telephone number with the second telephone number if a number of originating calls to the first telephone number is in excess of a threshold number of originations. Alternatively, the method can merely disregard calls to the first telephone number originating from a same telephone number has exceeded the threshold.

Stage 604 associates the third telephone number with the second telephone number if the number of originating calls to the first telephone number is in excess of the threshold number of originations. For example, the call-through engine 130 can associate the third telephone number with the second telephone number if the number of originating calls to the first telephone number is in excess of the threshold number of originations.

Figure 7:
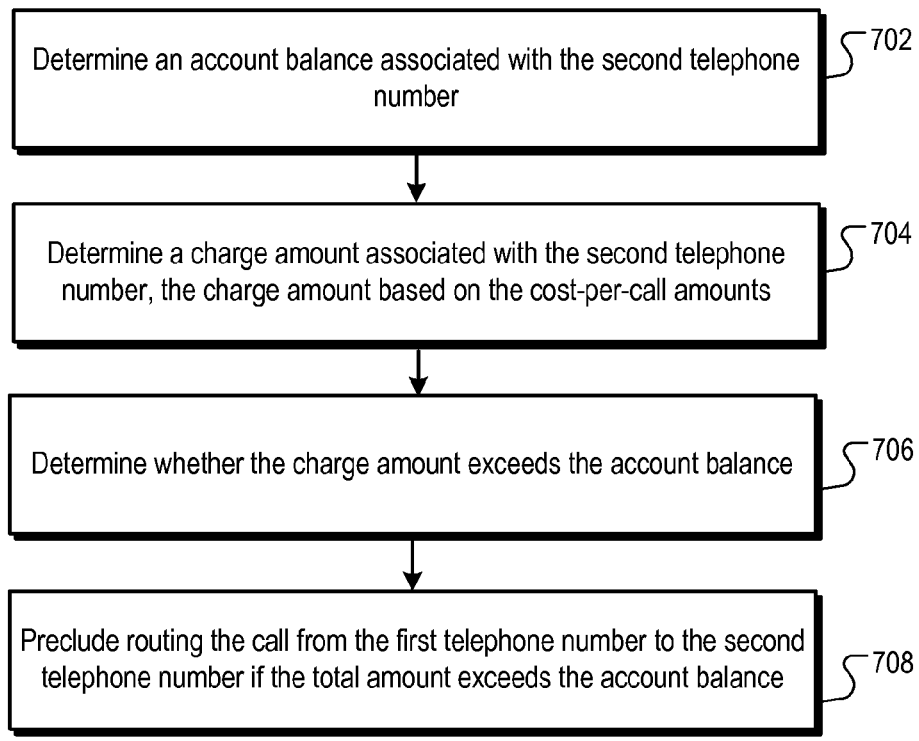
FIG. 7 is a flow diagram of an example process for conditionally routing calls based on an account balance Like reference numbers and designations in the various drawings indicate like elements.

FIG. 7 is a flow diagram of an example process 700 for conditionally routing calls based on an account balance. The process 700 can, for example, be implemented in the advertisement management system 104 of FIG. 1, or in some other hardware and software computing device Stage 702 determines an account balance associated with the second telephone number. For example, the call-through engine 130 can determine an account balance associated with the second telephone number.

Stage 704 determines a charge amount associated with the second telephone number, the charge amount based on, for example, the cost-per-call amounts. For example, the call-through engine 130 can determine a charge amount associated with the second telephone number, the charge amount based on the cost-per-call amounts.

Stage 706 determines whether the charge amount exceeds the account balance. For example, the call-through engine 130 can determine whether the charge amount exceeds the account balance.

Stage 708 precludes routing the call from the first telephone number to the second telephone number if the total amount exceeds the account balance. For example, the call-through engine 130 can preclude routing the call from the first telephone number to the second telephone number if the total amount exceeds the account balance.

While the advertisements described are directed to online advertisements, the methods and systems can be used for advertisements outside of an online context. For example, the advertisements can be placed on billboards, in magazines, books, video games, and can be tracked in the same manner as described above. The advertisements can also be audio advertisements such as advertisements on the radio. For example, a user can hear an advertisement on the radio and call a telephone number that is announced in the advertisement. The telephone number can be a unique number that is associated with the actual telephone number of the advertiser. Therefore, the call to the advertiser can be tracked since the unique telephone number was called and then routed to the actual telephone number of the advertiser.

The call-through engine 130 can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method, comprising:
    associating a first telephone number with a second telephone number, the second telephone number being associated with an advertiser;
    receiving a call placed to the first telephone number, the call being placed to the first telephone number responsive to the first telephone number being displayed on a web based advertisement for the advertiser;
    routing the call to the second telephone number based on the association of the second telephone number with the first telephone number;
    determining that a call-through event has occurred if a calling number associated with an origination of the call has not originated calls to the first telephone number in excess of a threshold number of originations; and
    charging the advertiser associated with the second telephone number a cost-per-call amount in response to determining that the call-through event has occurred.

2. The method of claim 1, further comprising determining that the call-through event has not occurred if the calling number has originated calls to the first telephone number in excess of the threshold number of originations.

3. The method of claim 1, further comprising:
    determining that an expiration event has occurred; and
    disassociating the first telephone number with the second telephone number in response to determining that the expiration event has occurred.

4. The method of claim 3, further comprising precluding association of the first telephone number with another second number for at least a minimum time period in response to determining that the expiration event has occurred.

5. The method of claim 3, wherein the expiration event is a predetermined amount of time.

6. A system, comprising:
    a data store that stores a first telephone number and a second telephone number, the second telephone number being associated with an advertiser;
    one or more processors configured to interact with the data store, the one or more processors being further configured to perform operations comprising:
        associating a first telephone number with a second telephone number;
        receiving a call placed to the first telephone number, the call being placed to the first telephone number responsive to the first telephone number being displayed on a web based advertisement for the advertiser;
        routing the call to the second telephone number based on the association of the second telephone number with the first telephone number;
        determining that a call-through event has occurred if a calling number associated with an origination of the call has not originated calls to the first telephone number in excess of a threshold number of originations; and
        charging the advertiser associated with the second telephone number a cost-per-call amount in response to determining that the call-through event has occurred.

7. The system of claim 6, wherein the one or more processors are further configured to perform operations comprising determining that the call-through event has not occurred if the calling number has originated calls to the first telephone number in excess of the threshold number of originations.

8. The system of claim 6, wherein the one or more processors are further configured to perform operations comprising:
    determining that an expiration event has occurred; and
    disassociating the first telephone number with the second telephone number in response to determining that the expiration event has occurred.

9. The system of claim 8, wherein the one or more processors are further configured to perform operations comprising precluding association of the first telephone number with another second number for at least a minimum time period in response to determining that the expiration event has occurred.

10. The system of claim 8, wherein the expiration event is a predetermined amount of time.

11. A non-transitory computer storage medium encoded with a computer program, the program comprising instructions that when executed by data processing apparatus cause the data processing apparatus to perform operations comprising:
    associating a first telephone number with a second telephone number, the second telephone number being associated with an advertiser;
    receiving a call placed to the first telephone number, the call being placed to the first telephone number responsive to the first telephone number being displayed on a web based advertisement for the advertiser;
    routing the call to the second telephone number based on the association of the second telephone number with the first telephone number;
    determining that a call-through event has occurred if a calling number associated with an origination of the call has not originated calls to the first telephone number in excess of a threshold number of originations; and
    charging the advertiser associated with the second telephone number a cost-per-call amount in response to determining that the call-through event has occurred.

12. A computer-implemented method, comprising:
    associating a first telephone number with a second telephone number until an occurrence of an expiration event;
    determining whether the expiration event has occurred;
    if the expiration event has occurred:
        disassociating the first telephone number from the second telephone number; and
        precluding association of the first telephone number with another second number for at least a minimum time period;

if the expiration event has not occurred:
  routing a call from the first telephone number to the second telephone number; and
  charging an advertiser associated with the second telephone number a cost-per-call amount.

13. The method of claim 12, further comprising:
  associating a third telephone number with the second telephone number until an occurrence of another expiration event if the expiration event has occurred;
  receiving a call to the first telephone number; and
  announcing the third telephone number in the call if the expiration event has occurred.

14. The method of claim 12, wherein the expiration event is a predetermined period of time.

15. The method of claim 12, further comprising:
  identifying a calling number associated with an origination of the call;
  determining whether the calling number has originated calls to the first telephone number in excess of a threshold number of originations; and
  precluding routing the call from the first telephone number to the second telephone number if the calling number has originated calls to the first telephone number in excess of the threshold number of originations.

16. The method of claim 15, further comprising presenting the second telephone number if the calling number has originated calls to the first telephone number in excess of the threshold number of originations, the presenting comprising announcing the second telephone number in the call to the first telephone number.

17. A system, comprising:
  a data store that stores a first telephone number and a second telephone number;
  one or more processors configured to interact with the data store, the one or more processors being further configured to perform operations comprising:
    associating a first telephone number with a second telephone number until an occurrence of an expiration event;
    determining whether the expiration event has occurred;
    if the expiration event has occurred:
      disassociating the first telephone number from the second telephone number; and
      precluding association of the first telephone number with another second number for at least a minimum time period;
    if the expiration event has not occurred:
      routing a call from the first telephone number to the second telephone number; and
      charging an advertiser associated with the second telephone number a cost-per-call amount.

18. The system of claim 17, wherein the one or more processors are further configured to perform operations comprising:
  associating a third telephone number with the second telephone number until an occurrence of another expiration event if the expiration event has occurred;
  receiving a call to the first telephone number; and
  announcing the third telephone number in the call if the expiration event has occurred.

19. The system of claim 17, wherein the expiration event is a predetermined period of time.

20. The system of claim 17, wherein the one or more processors are further configured to perform operations comprising:
  identifying a calling number associated with an origination of the call;
  determining whether the calling number has originated calls to the first telephone number in excess of a threshold number of originations; and
  precluding routing the call from the first telephone number to the second telephone number if the calling number has originated calls to the first telephone number in excess of the threshold number of originations.

21. The system of claim 20, wherein the one or more processors are further configured to perform operations comprising presenting the second telephone number if the calling number has originated calls to the first telephone number in excess of the threshold number of originations, the presenting comprising announcing the second telephone number in the call to the first telephone number.

22. A non-transitory computer storage medium encoded with a computer program, the program comprising instructions that when executed by data processing apparatus cause the data processing apparatus to perform operations comprising:
  associating a first telephone number with a second telephone number until an occurrence of an expiration event;
  determining whether the expiration event has occurred;
  if the expiration event has occurred:
    disassociating the first telephone number from the second telephone number; and
    precluding association of the first telephone number with another second number for at least a minimum time period;
  if the expiration event has not occurred:
    routing a call from the first telephone number to the second telephone number; and
    charging an advertiser associated with the second telephone number a cost-per-call amount.

* * * * *